Patented June 27, 1933

1,915,311

UNITED STATES PATENT OFFICE

GEORGE F. HADLEY, OF PITTSBURGH, PENNSYLVANIA, ASSIGNOR TO WESTINGHOUSE ELECTRIC & MANUFACTURING COMPANY, A CORPORATION OF PENNSYLVANIA

INSULATING MATERIAL

No Drawing. Application filed August 11, 1927. Serial No. 212,363.

My invention relates to an improved insulating material for conductors, and especially for the coils of high-capacity alternating-current generators and turbo-alternators that are subjected to relatively high temperatures.

One of the main objects of my invention is to produce an improved insulating material composed of mica plates and a reinforcing member, the mica plates and the reinforcing member being secured and bound together by a new composition of matter containing a natural hydrocarbon, a polymerized vegetable oil and the reaction product of a resinous fluxizing agent and a polyhydric alcohol.
Another object of my invention is to produce a new composition of matter composed of a binding material that is soluble in hydrocarbons and that will serve to bind mica plates to each other and to a reinforcing member, so that a composite insulation sheet, when built up and applied to conductors, will not swell or be decomposed when subjected to high temperatures.

A further object of the invention is to produce a new insulation material that is inexpensive, may be easily and readily produced, that is subject to only slight swelling, does not deteriorate or decompose when applied to the conductors of generators operating at relatively high temperatures, and is characterized by having a low dielectric or insulation power loss.

Another object of my invention is to produce a new composition of matter that may be applied as a hydrocarbon solution to mica plates and which upon evaporation of the solvent, serves as a binder to secure the mica plates together and has the distinctly favorable qualities of comparatively low swelling and non-emission of gaseous vapors when subjected to comparatively high temperatures. My composition of matter has the further advantage that by varying the proportions of the ingredients, the binder will soften at predetermined temperatures so that mica plates secured together by my improved binder may be readily applied to conductors.

A still further object of my invention is to provide a new binding material and a new reinforcing material for mica plates which when subjected to prolonged heating at 150° will give minimum vapor pressures and will be free from decomposition.

It has previously been the custom of some manufacturers to insulate the conductors of turbo-generators and other rotating apparatus with a composite sheet of material that is known in the art as "mica-folium" and which is composed of mica plates bound together and to a reinforcing sheet of .0025 inch hemp paper by a binding material composed of shellac. Layers of this material were wound around the conductors or coils of the machines, so that a 2-ply to 6-ply fold was obtained. The insulation produced in this manner has not proved entirely satisfactory, especially when subjected to the relatively high temperatures which occur in such machines. The laminated insulation would first swell, after which the insulation would deteriorate rapidly.

After long experimentation in which almost every conceivable factor was taken into consideration, I have discovered that the swelling of the insulation is due to pressure produced by the shellac becoming liquid at high temperature and to the formation of a gas or vapor in the mica laminations. It is well known that shellac differs from other resins in that it is not readily soluble in the ordinary vegetable or mineral oils, and it is, therefore, necessary to apply it to the mica plates in the form of an alcohol solution, from which the alcohol does not completely evaporate.

Alcohol has a low boiling-point and, therefore, its pressure vapor is high at relatively low temperatures, for example, at 115° C. alcohol has a vapor pressure of 55 lbs. per square inch, and if heated to higher temperatures, the vapor pressure becomes considerably higher. Shellac itself softens at comparatively low temperatures and, when subjected to a temperature ranging from 100 to 150° C. becomes liquid. The pressure resulting from the liquid shellac together with the vapor pressure resulting from the alcohol and the moisture from the paper used as a reinforcing member, causes the swelling previously mentioned, which is in evidence in the first stage in the decomposition of the folium.

As the follow up is important for turbo-generators, as compared with the slow moving direct-current generators operating on comparatively low voltages, the position of the insulation and the current-carrying current at much higher voltages and at turbo-alternators capable of carrying current at much higher voltages and ...

and dried, the binder produced will have a melting point of about 200° C., but will reinforcing member, causes the swelling previously mentioned, which is evidently the first stage in the decomposition of the insulation.

The tendency at the present time is to develop turbo-alternators capable of generating current at much higher voltage than was formerly the practice. It can, therefore, be readily understood that a shellac binder for mica folium is impractical for high voltage turbo-generators, as considerable loss results from the continuous swelling and decomposition of the insulation, and the consequent necessity of discontinuing the operation of the generator while the insulation is being repaired.

My improved insulation, however, is not subject to any of these objections, as by varying the proportions of the ingredients, the softening point of the binder may be raised or lowered to suit the temperature to which the insulation will be subjected and the gaseous vapors emitted from the bonding material are so slight that they do not cause the insulation to swell. I also make use of a new type of paper reinforcing member which contains only very small quantities of moisture and other decomposition products.

The following specific examples will illustrate and explain the essential features of my bonding material. Thirty-two pounds of rosin, twenty-two pounds of China-wood oil and three and one-half pounds of glycerol, are heated together in a suitable varnish kettle, which is completely covered with the exception of apertures provided for the insertion of a thermometer and stirring paddles. The heating operation is carried on as rapidly as practicable until the temperature reaches 300° C., the mixture being maintained at this temperature for about 30 minutes. Ninety-two pounds of pulverized manjak are then added, and the heating is continued, with an occasional stirring, at 250° C. for approximately 4 hours, or until the fusion of the ingredients is complete, the mixture free from lumps, and substantially all excess gaseous material driven off. The material is then poured into pans and allowed to cool, after which it is ground, passed through a 15 mesh sieve and the pulverized bond thus obtained is dissolved in a hydrocarbon solvent such as gasolene, benzol, toluol, xylol, or in a mixture of two or more of these solvents.

In building up my mica plates, I prefer to use a composition composed of about 160 lbs. of pulverized bond dissolved in a solvent consisting of 16 gallons of benzol and 16 gallons of gasolene, but, of course, the amount of solvent added may be varied to suit any particular requirements. After the bonding material has been applied to the mica plates and dried, the binder produced will have a melting point of about 200° C., but will soften at 150° so as to give proper adhesiveness for wrapping turbo coils, and it contains not more than about .5% of solvent material. The bond is low in volatile matter and is characterized by having high flexibility, and a low di-electric or insulation power loss. The increased flexibility and low volatile content in my improved binder permits the percentage of mica in the composite insulation sheet to be increased and makes possible the use of thinner insulation walls for the same voltage, thus improving the space factor and permitting the use of generators having smaller slots. A solution of shellac applied to mica folium in a similar manner, melts at 100° C., contains about 3% of solvent material, and has a softening temperature between 60° and 100° C.

In the process as outlined above, advantage is taken of the fact that China-wood oil, when heated at 250° to 270° C. rapidly polymerizes to a stiff jelly-like gum which is soluble in hot rosin. The glycerol is added to reduce the acid value of the rosin which is effected at the boiling point of glycerol, the acid of the rosin combining with glycerol to form glycerol-ester gum. It will, therefore, be understood that when the mixture is heated to approximately 300° C. the processes of polymerizing the China-wood oil, forming the acid-free rosin ester, and distilling off excessive gaseous material are carried on simultaneously.

The above ingredients may be mixed in different proportions; for example, I have found that when 8 parts of China-wood oil, 12 parts of rosin and one part of glycerol are mixed together and heated for 20 minutes at a temperature of approximately 300° C., a sticky gum is obtained which softens at about 60° C., and upon heating at 150° C. for 24 hours, it has a volatile loss of less than 1%. This product may then be fused with natural hydrocarbons, such as gilsonite or manjak, in various proportions, and a bonding material is obtained which softens at temperatures varying with the proportion of gilsonite or manjak and is free from tackiness at ordinary temperatures. Gilsonite fused into the above compositions in portions of one part of gilsonite in two parts of the compound, produces a black bonding material which has a softening point of 95 to 100° C. The volatile material given off is less than .82 per cent when exposed to a temperature of 150° C. for 24 hours, and when the bonding material is dissolved in a solvent in the ratio of one part of gum to two parts of solvent it may be applied to the mica plates and to the strengthening material in the usual manner.

In building my composite insulating sheet, I apply the bonding material obtained as above described to the paper used as a reinforcing material. The paper used for this purpose may be either .001 inch Japanese or Dexter paper which is made from cotton fibre, or a .0025 inches kraft paper which is made from wood pulp, as I have discovered that paper of this description contains considerably less volatile matter than paper made from hemp or jute. The heavier kraft paper is preferred for "mica folium", as this is reinforced with only one sheet of paper. The lighter Japanese or Dexter paper is used in preparing mica tape, which is reinforced on both sides. The paper is treated in continuous rolls on one side only in a manner well known in the art, after which it is passed through a drying oven at a temperature of 105 to 115° C., at the rate of 325 inches per minute. The dry coated paper should have .35 gram of black bond for each 36 square inches of surface.

The coating on the paper is then softened by running the paper under a roll, the coated side of which is immersed in a bond softening solution, after which the paper is passed over the inclined surface of a building table. As it passes over the table, a layer of overlapping mica plates is built upon the coated side. The mica-coated paper is now pressed and dried and another layer of the bonding material is applied and dried to a slight tackiness, whereupon a second coat of mica plate is applied, which is dried in a similar manner. After a third layer has been applied and dried, an additional layer of bond material is added. The viscosity of the final layer should be only 8 to 9 seconds as measured by the Stormer viscosimeter. The composite sheet is now passed through a drying tower having a temperature of 175° to 185° F. at the rate of 48 inches per minute. The mica tape is made in a similar manner, with the exception that only one or two layers of mica are applied to the coated sheet of paper and an additional layer of paper is added, after which the composite sheet is cut into strips and applied to the conductors in the form of tape.

It will be understood that my invention is not limited to the specific example given, particularly in regard to the composition of matter which I use as a binding material; for example, other natural or synthetic resins may serve as fluxizing agents in the above process such as copal, resin esters, or the synthetic resin produced by the reaction of glycerol and phthalic anhydride. Other vegetable drying oils may be used in place of China-wood oil, such as linseed or perilla oil. Gilsonite, stearine pitch, glance pitch and other natural hydrocarbons, especially those having a high melting point, may be used in place of all or a portion of the manjak. Gilsonite has proved particularly adaptable for this purpose Other polyhydric alcohols may be substituted for glycerol, such as ethylene or propylene, glycol, mannitol, or in fact any polyhydric alcohol which will serve to reduce the acidity of the resin. The proportions may also be widely varied, the amount of natural hydrocarbons that is added depending upon whether a higher or lower softening point is desired.

From the above description, it will be seen that I have produced a composite insulation that may be easily applied, that will not soften at the temperatures ordinarily encountered in rotating apparatus in which the gaseous vapors are reduced to a minimum and which will have better insulating properties than insulating materials now in use, thereby ensuring the proper insulation of high capacity machine or enabling the use of insulation for machines that is thinner and develops smaller heat losses.

It should be pointed out that my invention is not limited to the particular examples given, but the conditions of preparing the binder, the composite insulation sheet, and the proportions of ingredients used as a binder, may be modified to suit varying conditions, and other changes and modifications may be made, as will be apparent to those skilled in the art, without departing from the spirit and scope of my invention as defined in the appended claims.

I claim as my invention:

1. An insulating composition comprising mica plates superimposed upon each other and secured together by a composition of matter comprising a vegetable oil, a natural hydrocarbon, and the reaction product of a polyhydric alcohol and a fluxizing agent.

2. An insulating composition comprising mica plates superimposed upon each other and secured together by a composition of matter comprising a polymerized vegetable oil, a natural hydrocarbon and the reaction product of a polyhydric alcohol and a resin.

3. A laminated structure used for insulating purposes comprising mica plates superimposed upon each other and secured together by a composition of matter comprising polymerized China-wood oil, a natural hydrocarbon and the reaction product of rosin and a polyhydric alcohol.

4. A laminated structure used for insulating purposes comprising mica plates superimposed upon each other and secured together by a composition of matter comprising polymerized China-wood oil, a natural hydrocarbon and the reaction product of glycerol and rosin.

5. A laminated structure used for insulating purposes comprising mica plates superimposed upon each other and secured together by a composition of matter comprising polymerized China-wood oil, manjak and the reaction product of glycerol and rosin.

6. A laminated structure used for insulating purposes comprising mica plates and a reinforcing material, the mica plates being secured to each other and to the reinforcing material by means of a composition of matter comprising polymerized China-wood oil, a natural hydrocarbon and the reaction product of a polyhydric alcohol and rosin.

7. A laminated structure for electrical insulation comprising mica plates bound together by a low volatile insulating composition of matter comprising a polymerized vegetable oil and the reaction product of a polyhydric alcohol and a fluxizing agent.

8. A laminated structure for electrical insulation, comprising mica plates superimposed on each other, a reenforcing member of volatile content approximating kraft paper, and an electrically insulating bond securing the reenforcing member and the mica plates together and comprising polymerized vegetable oil, a neutralized resinous flux, and bituminous hydrocarbon, the entire structure having a volatile content of less than 0.82% in 24 hours at 150° C.

In testimony whereof, I have hereunto subscribed my name this 3rd day of August 1927.

GEORGE F. HADLEY.